US012600251B2

(12) United States Patent (10) Patent No.: US 12,600,251 B2
Nagatomi et al. (45) Date of Patent: Apr. 14, 2026

(54) ELECTRIC WORK VEHICLE

(71) Applicant: Kubota Corporation, Osaka (JP)

(72) Inventors: Tatsuya Nagatomi, Sakai (JP);
Takafumi Komatsu, Sakai (JP)

(73) Assignee: Kubota Corporation, Osaka (JP)

( * ) Notice: Subject to any disclaimer, the term of this
patent is extended or adjusted under 35
U.S.C. 154(b) by 0 days.

(21) Appl. No.: 18/380,953

(22) Filed: Oct. 17, 2023

(65) Prior Publication Data

US 2024/0123845 A1 Apr. 18, 2024

(30) Foreign Application Priority Data

Oct. 18, 2022 (JP) ................................. 2022-167005

(51) Int. Cl.
B60L 53/16 (2019.01)
B60L 50/61 (2019.01)

(52) U.S. Cl.
CPC ............... B60L 53/16 (2019.02); B60L 50/61
(2019.02); *B60L 2200/40* (2013.01)

(58) Field of Classification Search
CPC ...... B60L 53/16; B60L 50/61; B60L 2200/40;
B60L 7/16; B60L 53/20; Y02T 10/70;
Y02T 10/7072; Y02T 90/14
See application file for complete search history.

(56) References Cited

U.S. PATENT DOCUMENTS

| | | | | |
|---|---|---|---|---|
| 9,827,971 | B2 * | 11/2017 | Suzuki | .................. B60L 53/126 |
| 2014/0197789 | A1 * | 7/2014 | Ono | ......................... B60L 53/18 |
| | | | | 320/109 |
| 2015/0034400 | A1 * | 2/2015 | Amano | .................. B60L 50/66 |
| | | | | 180/65.8 |
| 2022/0063428 | A1 * | 3/2022 | Kamikihara | .............. H02J 7/02 |
| 2022/0379970 | A1 | 12/2022 | Nakayama | |
| 2023/0173931 | A1 * | 6/2023 | Kohrs | .................... H02J 7/0045 |

FOREIGN PATENT DOCUMENTS

JP          2021957 A          1/2021

* cited by examiner

*Primary Examiner* — Lincoln D Donovan
*Assistant Examiner* — Alex W Lam
(74) *Attorney, Agent, or Firm* — The Webb Law Firm

(57) ABSTRACT

An electric work vehicle includes an on-board charger, a
power reception connector enabling attachment and detach-
ment of a charging cable that is to be connected to the
on-board charger, and an energizing cable that connects the
power reception connector and the on-board charger to each
other. Charging ports that enable attachment and detachment
of the power reception connector are provided in both a left
side portion of a body and a right side portion of the body.
The charging ports are provided at positions higher than
upper ends of travel devices.

2 Claims, 4 Drawing Sheets

ELECTRIC WORK VEHICLE

CROSS-REFERENCE TO RELATED APPLICATION

This application claims priority to Japanese Patent Application No. 2022-167005 filed Oct. 18, 2022, the disclosure of which is hereby incorporated by reference in its entirety.

BACKGROUND OF THE INVENTION

Field of the Invention

The present invention relates to an electric work vehicle.

Description of Related Art

As shown in Patent Document 1, there is an electric work vehicle (tractor) that includes an electric motor (motor) for driving a travel device (front wheel, rear wheel) and a battery (travel battery) for supplying power to the electric motor.

PATENT DOCUMENT

Patent Document 1: JP 2021-957A

SUMMARY OF THE INVENTION

With the above-described work vehicle, there is desire for the battery to be rechargeable.

The present invention provides an electric work vehicle that enables easily charging a battery, suppresses malfunction, and can achieve a reduction in cost.

An electric work vehicle according to an aspect of the present invention includes:

an electric motor configured to drive at least one travel device;

a battery configured to supply power to the electric motor;

an on-board charger configured to charge the battery;

a power reception connector connectable to the on-board charger, and to which a charging cable connected to a charging stand is attachable and from which the charging cable is detachable;

an energizing cable connecting the power reception connector and the on-board charger to each other; and charging ports to which the power reception connector is attachable and from which the power reception connector is detachable, the charging ports being located at positions higher than an upper end of the at least one travel device in a left side portion of a body of the electric work vehicle and a right side portion of the body, respectively.

According to this configuration, when the vehicle can only be parked in a situation where the power source, such as a charging stand, is located on the left side of the body, if the power reception connector is attached to the charging port of the left side portion rather than being attached to the charging port of the right side portion, the charging cable from the power source can be connected to the power reception connector that is closer to the power source when charging the battery. When the vehicle can only be parked in a situation where the power source is located on the right side of the body, if the power reception connector is attached to the charging port of the right side portion rather than being attached to the charging port of the left side portion, the charging cable from the power source can be connected to the power reception connector that is closer to the power source when charging the battery.

Also, when the vehicle can be parked in a situation where the power source is located on either the left side of the body or the right side of the body, if the power reception connector is attached to the charging port on the same side as the power source rather than being attached to the charging port on the side opposite to the power source, the charging cable from the power source can be connected to the power reception connector that is closer to the power source when charging the battery.

In other words, regardless of whether the vehicle is parked in a situation where the power source is located on the left side of the body or a situation where the power source is located on the right side of the body, the charging cable can be connected to the power reception connector that is closer to the power source, and thus the battery can be charged easily.

Since the power reception connector can be switched between the charging port of the left side portion of the body and the charging port of the right side portion of the body, the number of power reception connectors and energizing cables that are required can be reduced, thus making it possible to achieve a reduction in cost. Since the charging port of the left side portion and the charging port of the right side portion are provided at positions higher than the upper ends of the travel devices, it is possible to easily avoid the intrusion of water and the like into the charging ports even when traveling through a wet terrain or a puddle, and it is possible to suppress malfunction of the charging ports and the power reception connector attached to either one of the charging ports.

In an aspect of the present invention, it is preferable that the at least one travel device includes front wheels and rear wheels, and the charging ports are respectively located above the front wheels in the left side portion of the body and the right side portion of the body.

According to this configuration, the charging ports are located in the vicinity of the driving section, and therefore when the travel body is parked near the power source, the locations of the charging ports can be easily checked from the driving section, and the position of either one of the charging ports relative to the power source can be easily adjusted.

In an aspect of the present invention, it is preferable that the electric work vehicle further includes a front lid in a front portion of the body, and the on-board charger is in a space inward of the front lid.

According to this configuration, the on-board charger and either one of the charging ports can be easily brought close to each other, thus allowing the energizing cable to be shortened and handled more easily while also covering the on-board charger with the front lid, and furthermore, the power reception connector can be easily switched between the charging port of the right side portion and the charging port of the left side portion.

In an aspect of the present invention, it is preferable that the on-board charger has a cable connection location at which the energizing cable is connected, and a distance from the cable connection location to the charging port of the left side portion is equivalent to a distance from the cable connection location to the charging port of the right side portion.

In the case where the distance from the cable connection location to the charging port of the left side portion is different from the distance from the cable connection location to the charging port of the right side portion, even if the length of the energizing cable is set such that the energizing cable does not sag much while the power reception connector is attached to the charging port that is farther from the cable connection location, the energizing cable is likely to sag while the power reception connector is attached to the charging port that is closer to the cable connection location. According to the above configuration, the length of the energizing cable can be set such that the energizing cable does not sag much regardless of whether the power reception connector is attached to the charging port of the left side portion or attached to the charging port of the right side portion, thus enabling the energizing cable to be easily handled and switched when switching the power reception connector between the charging port of the right side portion and the charging port of the left side portion.

In an aspect of the present invention, it is preferable that the electric work vehicle further includes caps configured to respectively open and close the charging ports.

According to this configuration, the intrusion of water and the like into the charging ports can be easily avoided by closing the charging ports with the caps.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

Best Mode for Carrying Out the Invention

An embodiment that is an example of the present invention will be described below with reference to the drawings.

Figure 1:
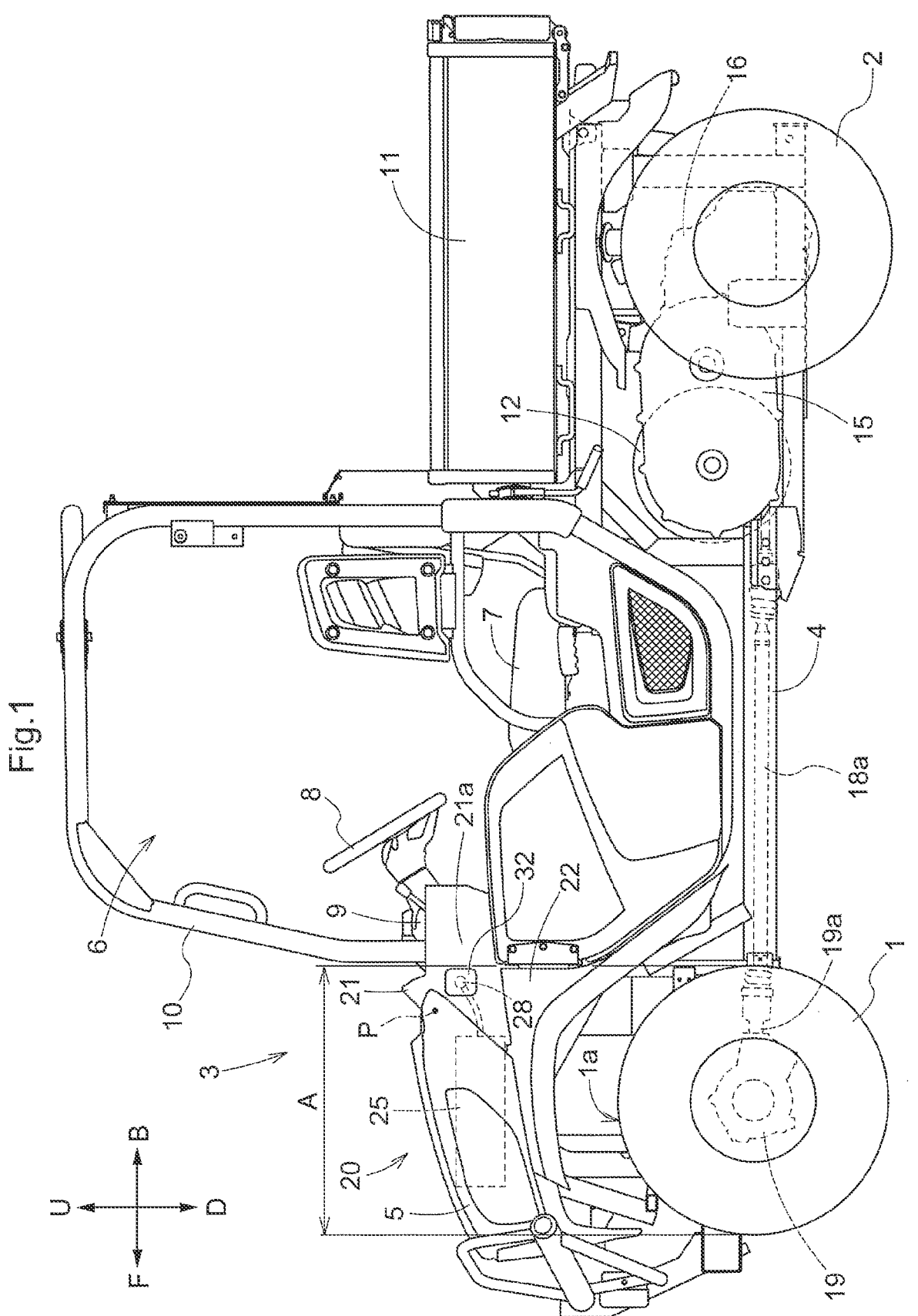
FIG. 1 is a side view of an electric utility vehicle.

In the following description, regarding directions relative to the travel body of the electric utility vehicle (an example of an "electric work vehicle"), the direction indicated by the arrow F in FIG. 1 is "forward" relative to the body, the direction indicated by the arrow B is "rearward" relative to the body, the direction indicated by the arrow U is "upward" relative to the body, the direction indicated by the arrow D is "downward" relative to the body, the direction from the rear surface of the FIG. 1 page toward the front surface is "leftward" relative to the body, and the direction from the front surface of the FIG. 1 page toward the rear surface is "rightward" relative to the body. The left-right direction of the body corresponds to the lateral width direction of the body.

Overall Configuration of Electric Utility Vehicle

As shown in FIG. 1, the electric utility vehicle includes a travel body 3 supported by a pair of left and right front wheels 1 that constitute a travel device and can be driven and steered, and a pair of left and right rear wheels 2 that constitute a travel device and can be driven. The travel body 3 includes a body frame 4 extending in the front-rear direction of the travel body 3 and located in a lower portion of the travel body 3, and a front lid 5 located in a front portion of the travel body 3. A driving section 6, in which a driver rides, is provided in a front portion of the travel body 3. The driving section 6 includes a driver seat 7, a steering wheel 8 for steering the front wheels 1, a dashboard 9, a roll over protection structure (ROPS) 10, and the like. A loading platform 11 is supported by the body frame 4 at a location rearward of the driving section 6.

Configuration for Driving Front Wheels and Rear Wheels

As shown in FIG. 1, an electric motor 12 is provided below the loading platform 11, and the front wheels 1 and the rear wheels 2 are driven by the electric motor 12.

Figure 2:
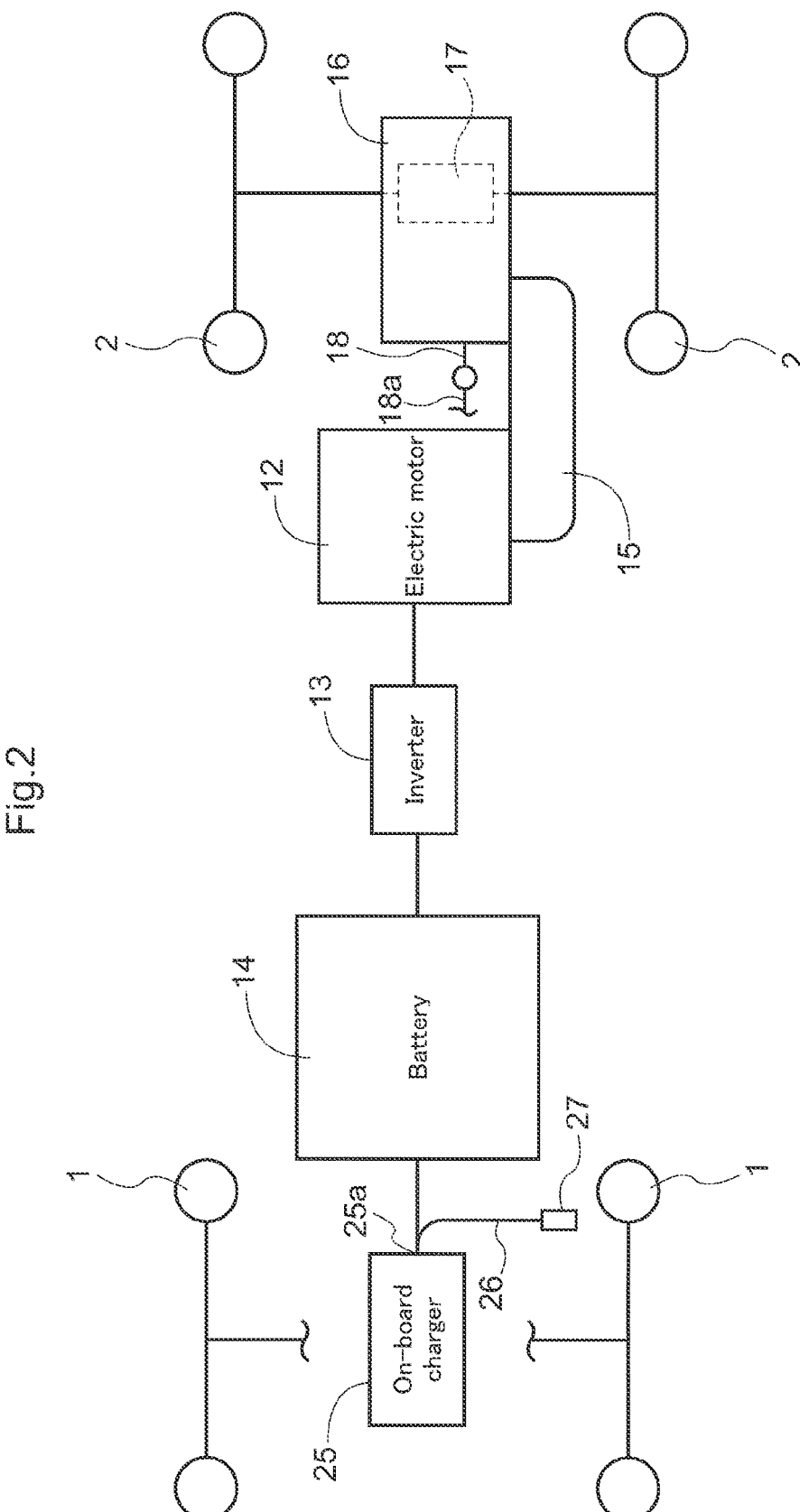
FIG. 2 is a block diagram showing a drive structure for driving front wheels and rear wheels.

Specifically, as shown in FIG. 2, an inverter 13 is connected to the electric motor 12, and a battery 14 is connected to the inverter 13. The inverter 13 and the battery 14 are mounted to the travel body 3. An input section (not shown) of a continuously variable transmission 15 is coupled to an output section (not shown) of the electric motor 12, and an input section (not shown) of a travel transmission 16 is coupled to an output section (not shown) of the continuously variable transmission 15. The travel transmission 16 is provided with a rear wheel differential mechanism 17. A front wheel output shaft 18 is provided in a front portion of the travel transmission 16, and the front wheel output shaft 18 and an input shaft 19a of a front wheel differential mechanism 19 (see FIG. 1) are coupled via a rotation shaft 18a. In the present embodiment, the continuously variable transmission 15 is configured as a belt-type continuously variable transmission, but a hydrostatic continuously variable transmission can be used as the continuously variable transmission 15.

DC power output from battery 14 is input to the inverter 13 and converted into AC power. Also, AC power output from the inverter 13 is input to the electric motor 12, and the electric motor 12 is thus driven. Motive power output from the electric motor 12 is input to the continuously variable transmission 15, and the speed of the motive power is changed. Also, motive power output from the continuously variable transmission 15 is input to the travel transmission 16 and converted into rear wheel driving force and front wheel driving force. The rear wheel driving force is transmitted to the rear wheel differential mechanism 17, and is then transmitted from the rear wheel differential mechanism 17 to the left and right rear wheels 2. The front wheel driving force is transmitted from the front wheel output shaft 18 to the front wheel differential mechanism 19 via the rotation shaft 18a. The front wheel driving force is then transmitted from the front wheel differential mechanism 19 to the left and right front wheels 1.

Configuration for Charging Battery

As shown in FIG. 1, a front panel section 20 constituting the body front portion of the travel body 3 includes the front lid 5 located in an upper portion of the front panel section 20, a dash panel 21 that separates the space inward of the front lid 5 from the driving section 6, and front side panels 22 respectively located at a left side portion and a right side portion of the front panel section 20. The front lid 5 is capable of vertically swinging open and close about a fulcrum axis P (see FIG. 1) extending in the lateral width direction of the body in a rear portion of the front lid 5.

Figure 3:
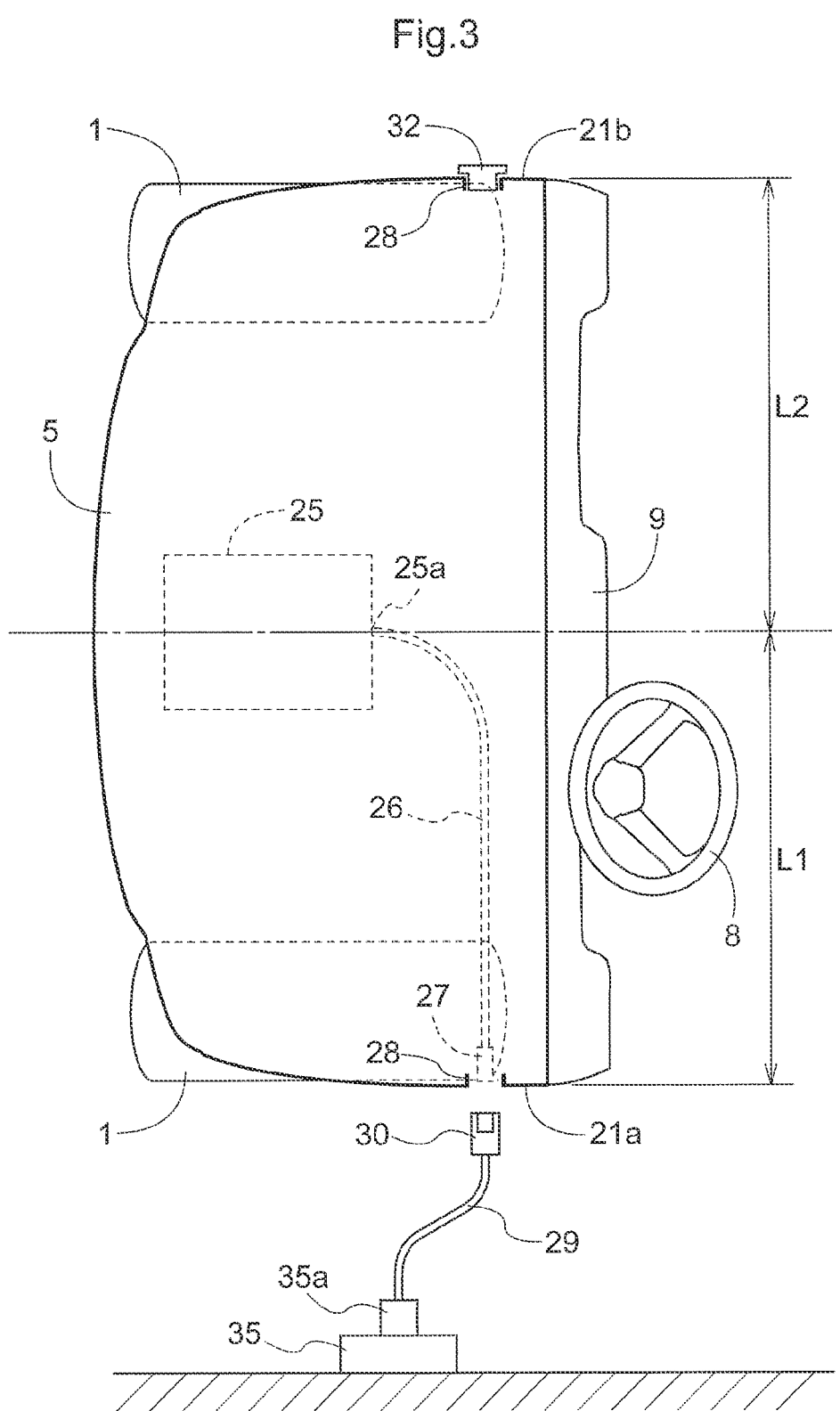
FIG. 3 is a plan view showing an on-board charger and charging ports.

As shown in FIGS. 1 and 3, an on-board charger 25 capable of charging the battery 14 is provided in the space inward of the front lid 5. The on-board charger 25 is provided with an energizing cable 26 in a rear portion of the on-board charger 25. The energizing cable 26 is flexible and can be bent. A power reception connector 27 is connected to the end portion of the energizing cable 26 on the side opposite to the on-board charger 25. The power reception connector 27 is connected to the on-board charger 25 via the energizing cable 26, and is capable of supplying power to the on-board charger 25. In the present embodiment, the energizing cable 26 is inseparably connected to the on-board charger 25.

As shown in FIGS. 1 and 3, charging ports 28 are formed in both a left lateral portion 21*a* of a left side portion of the body and a right lateral portion 21*b* of a right side portion of the body. The left lateral portion 21*a* corresponds to a left lateral portion of the dash panel 21, and the right lateral portion 21*b* corresponds to a right lateral portion of the dash panel 21.

Inside the body, the power reception connector 27 can be attached to the charging port 28 of the left lateral portion 21*a* and the charging port 28 of the right lateral portion 21*b*. Furthermore, inside the body, the power reception connector 27 can be removed from the charging port 28 in the left lateral portion 21*a* and the charging port 28 in the right lateral portion 21*b*. In other words, the power reception connector 27 can be attached to and detached from the charging ports 28. When the power reception connector 27 is attached to the charging port 28 of the left lateral portion 21*a* or the charging port 28 of the right lateral portion 21*b*, a charging cable 29 can be connected to the power reception connector 27 on the corresponding lateral side of the body. Also, at the charging port 28 of the left lateral portion 21*a* and the charging port 28 of the right lateral portion 21*b*, the charging cable 29 can be removed from the power reception connector 27 on the corresponding lateral side of the body. In other words, the charging cable 29 can be attached to and detached from the power reception connector 27. The charging cable 29 is connected to the power reception connector 27 by connecting a power supply connector 30 (see FIG. 3), which is connected to the end portion of the charging cable 29, to the power reception connector 27. The charging port 28 of the left lateral portion 21*a* and the charging port 28 of the right lateral portion 21*b* can each be opened and closed by a detachable cap 32 (see FIG. 3).

The charging port 28 of the left lateral portion 21*a* and the charging port 28 of the right lateral portion 21*b* are provided at a higher position than upper ends 1*a* of the front wheels 1. This facilitates avoiding the intrusion of water and the like into the charging ports 28 even when driving through a wet terrain or a puddle.

The charging port 28 of the left lateral portion 21*a* and the charging port 28 of the right lateral portion 21*b* are provided above the front wheels 1. As a result, the charging ports 28 are in the vicinity of the driving section 6, and the locations of the charging ports 28 on the travel body 3 can be easily checked from the driving section 6. In the present embodiment, the charging port 28 of the left lateral portion 21*a* and the charging port 28 of the right lateral portion 21*b* are each located in a region A corresponding to the diameter of the corresponding front wheel 1 above that front wheel 1, as shown in FIG. 1. In other words, the charging ports 28 are each provided in a range corresponding to the diameter of the corresponding front wheel 1 in the front-rear direction of the body. Specifically, the charging ports 28 are each located rearward of the front end portion of the corresponding front wheel 1. Also, the charging ports 28 are located forward of the rear end portion of the corresponding front wheel 1. The present invention is not limited to this, and the charging ports 28 may be provided at a location slightly forward or rearward of the region A.

As shown in FIG. 3, a distance L1 from a cable connection location 25*a*, at which the energizing cable 26 is connected to the on-board charger 25, to the charging port 28 of the left lateral portion 21*a* is equivalent to a distance L2 from the cable connection location 25*a* to the charging port 28 of the right lateral portion 21*b*. Accordingly, the length of the energizing cable 26 can be set such that the energizing cable 26 does not have much slack both when the power reception connector 27 is attached to the charging port 28 of the left lateral portion 21*a* and when the power reception connector 27 is attached to the charging port 28 of the right lateral portion 21*b*.

The battery 14 can be charged based on the following procedure.

Figure 4:
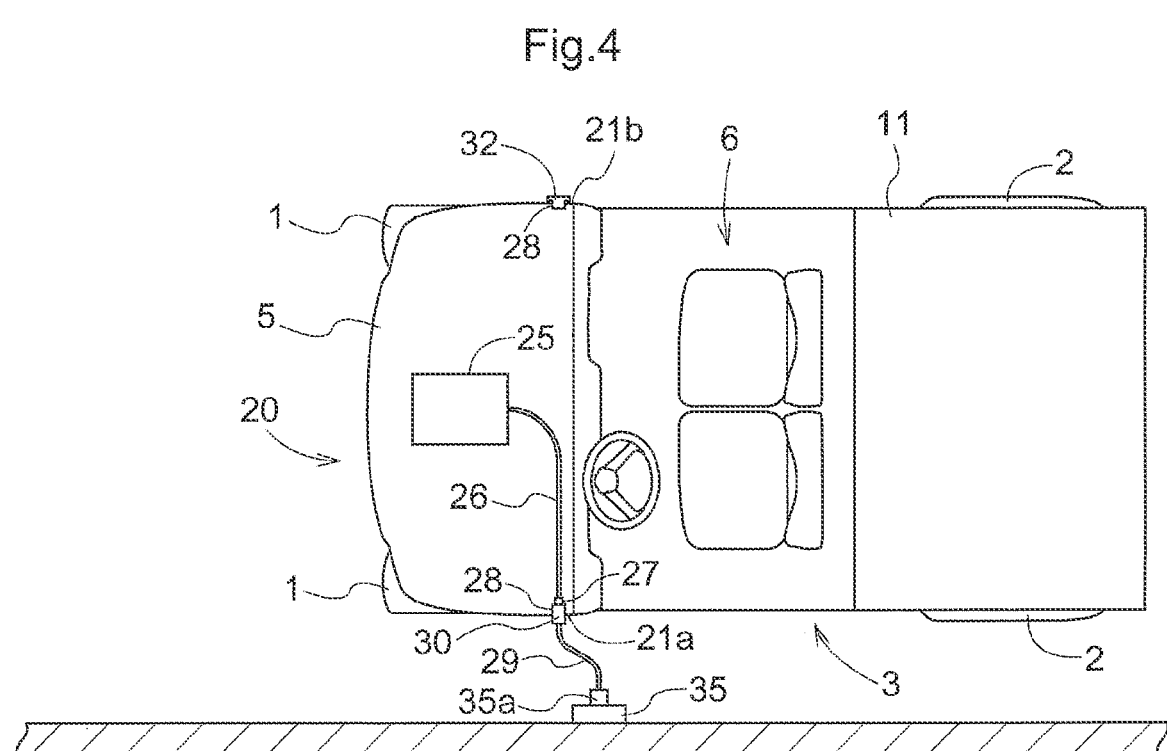
FIG. 4 is an illustrative diagram showing a charging procedure.

As shown in FIG. 4, when the vehicle is parked in a situation where a charging stand 35 (an example of a power source) is located on the left side of the travel body 3, the front lid 5 is opened, and then the power reception connector 27 is attached to the charging port 28 of the left lateral portion 21*a*. The cap 32 is then detached from the charging port 28 to open the charging port 28. If the power reception connector 27 was stored in a state of being attached to the charging port 28 of the right lateral portion 21*b*, the power reception connector 27 is switched from the charging port 28 of the right lateral portion 21*b* to the charging port 28 of the left lateral portion 21*a*. The power supply connector 30 of the charging cable 29 is then connected to the power reception connector 27 attached to the charging port 28 of the left lateral portion 21*a*. Next, the end portion of the charging cable 29 on the side opposite to the charging port 28 is connected to a connector 35*a* of the charging stand 35, and power is supplied from the charging stand 35 to the on-board charger 25 via the charging cable 29 and the energizing cable 26.

Figure 5:
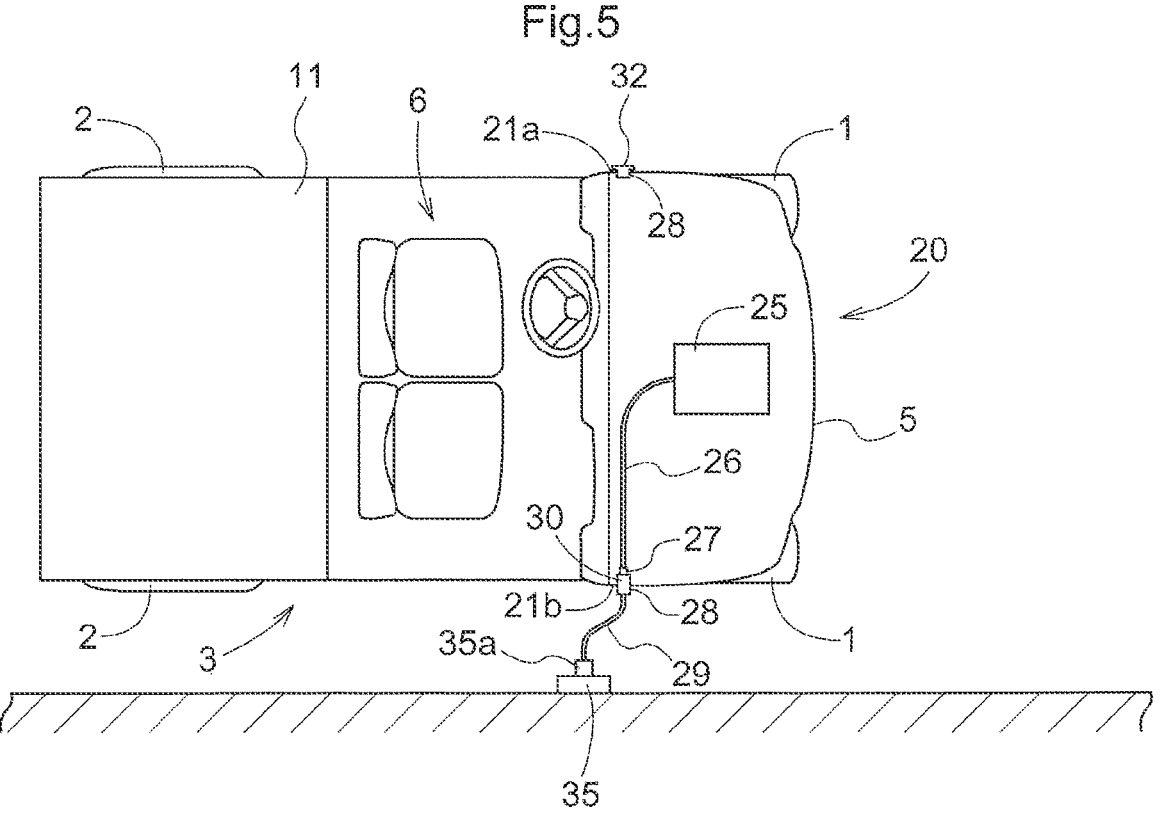
FIG. 5 is an illustrative diagram showing a charging procedure.

As shown in FIG. 5, when the vehicle is parked in a situation where the charging stand 35 is located on the right side of the travel body 3, the front lid 5 is opened, and then the power reception connector 27 is attached to the charging port 28 of the right lateral portion 21*b*. The cap 32 is then detached from the charging port 28 to open the charging port 28. If the power reception connector 27 was stored in a state of being attached to the charging port 28 of the left lateral portion 21*a*, the power reception connector 27 is switched from the charging port 28 of the left lateral portion 21*a* to the charging port 28 of the right lateral portion 21*b*. The power supply connector 30 of the charging cable 29 is then connected to the power reception connector 27 attached to the charging port 28 of the right lateral portion 21*b*. Next, the end portion of the charging cable 29 on the side opposite to the charging port 28 is connected to the connector 35*a* of the charging stand 35, and power is supplied from the charging stand 35 to the on-board charger 25 via the charging cable 29 and the energizing cable 26.

Other Embodiments (1) In the embodiment described above, an example is described in which the charging ports 28 are provided in the left lateral portion 21*a* and the right lateral portion 21*b* of the dash panel 21, but the present invention is not limited to this, and the left side portion and the right side portion of the body where the charging ports 28 are provided may be any locations on the left side portion and the right side portion of the body, such as the left and right front side panels 22. For example, in the case where the front wheels 1 and the rear wheels 2 are employed as travel devices, the charging ports 28 are not limited to being provided above the front wheels 1, and may be provided at any location, such as above the rear wheels 2.

(2) In the embodiment described above, an example is described in which the front wheels 1 and the rear wheels 2 are provided, but the travel devices may be crawler travel devices or travel devices that include a combination of wheels and mini-crawlers, for example.

(3) In the embodiment described above, an example is described in which the on-board charger 25 is provided in the space inward of the front lid 5, but the present invention is not limited to this, and the on-board charger 25 may be provided at any location in the travel body 3.

(4) In the embodiment described above, an example is described in which the distance L1 and the distance L2 are equivalent to each other, but the distance L1 and the distance L2 may be different from each other.

(5) In the embodiment described above, an example is described in which the caps 32 are provided, but the caps 32 may be omitted.

(6) In the above embodiment, an example is described in which the energizing cable 26 is inseparably connected to the on-board charger 25, but a configuration is also possible in which a connector is provided between the on-board charger 25 and the energizing cable 26, and the energizing cable is separately connected to the on-board charger 25 via the connector.

(7) The electric work vehicle is not limited to being an electric utility vehicle, and may also be an electric tractor or the like.

INDUSTRIAL APPLICABILITY

The present invention is applicable to the electric work vehicle including an electric motor that drives a travel device and a battery that supplies electric power to the electric motor.

DESCRIPTION OF REFERENCE SIGNS

1 Front wheel (travel device)
2 Rear wheel (travel device)
5 Front lid
12 Electric motor
14 Battery
21a Left lateral portion (left side portion)
21b Right lateral portion (right side portion)

25 On-board charger
25a Cable connection location
26 Energizing cable
27 Power reception connector
28 Charging port
29 Charging cable
32 Cap
L1 Distance
L2 Distance

The invention claimed is:

1. An electric work vehicle comprising:
an electric motor configured to drive at least one travel device;
a battery configured to supply power to the electric motor;
an on-board charger configured to charge the battery;
a power reception connector connectable to the on-board charger, and to which a charging cable connected to a charging stand is attachable and from which the charging cable is detachable;
an energizing cable connecting the power reception connector and the on-board charger to each other; and
charging ports to which the power reception connector is attachable and from which the power reception connector is detachable, the charging ports located at positions higher than an upper end of the at least one travel device in a left side portion of a body of the electric work vehicle and a right side portion of the body, respectively,
wherein the at least one travel device comprises front wheels and rear wheels, and
wherein the charging ports are respectively located above the rear wheels in the left side portion of the body and the right side portion of the body, and
wherein the on-board charger has a cable connection located at which the energizing cable is connected, and a distance from the cable connection location to the charging port of the left side portion is equivalent to a distance from the cable connection location to the charging port of the right side portion.

2. The electric work vehicle according to claim 1, further comprising:
caps configured to respectively open and close the charging ports.

* * * * *